US011929058B2

(12) United States Patent
Zhou et al.

(10) Patent No.: US 11,929,058 B2
(45) Date of Patent: Mar. 12, 2024

(54) SYSTEMS AND METHODS FOR ADAPTING HUMAN SPEAKER EMBEDDINGS IN SPEECH SYNTHESIS

(71) Applicant: DOLBY LABORATORIES LICENSING CORPORATION, San Francisco, CA (US)

(72) Inventors: Cong Zhou, Fremont, CA (US); Xiaoyu Liu, San Mateo, CA (US); Michael Getty Horgan, San Francisco, CA (US); Vivek Kumar, Foster City, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 17/636,851

(22) PCT Filed: Aug. 18, 2020

(86) PCT No.: PCT/US2020/046723
§ 371 (c)(1),
(2) Date: Feb. 18, 2022

(87) PCT Pub. No.: WO2021/034786
PCT Pub. Date: Feb. 25, 2021

(65) Prior Publication Data

US 2022/0335925 A1 Oct. 20, 2022

Related U.S. Application Data

(60) Provisional application No. 63/023,673, filed on May 12, 2020, provisional application No. 62/889,675, filed on Aug. 21, 2019.

(51) Int. Cl.
*G10L 21/00* (2013.01)
*G10L 13/00* (2006.01)
(Continued)

(52) U.S. Cl.
CPC .......... *G10L 13/033* (2013.01); *G10L 13/047* (2013.01)

(58) Field of Classification Search
CPC ......... G10L 21/13; G10L 17/12; G10L 13/08; G10L 13/00
See application file for complete search history.

(56) References Cited

U.S. PATENT DOCUMENTS 4,797,929 A 1/1989 Gerson
6,006,184 A * 12/1999 Yamada .................. G10L 17/12 704/E17.01
(Continued)

FOREIGN PATENT DOCUMENTS

CN 102779508 A * 11/2012
CN 101432799 B * 1/2013 ........... G10L 13/033
(Continued)

OTHER PUBLICATIONS

Chen, Y. et al."Sample Efficient Adaptive Text-to-Speech" published s a conference paper at ICLR 2019, pp. 1-16.
(Continued)

*Primary Examiner* — Shreyans A Patel

(57) ABSTRACT

Novel methods and systems for adapting a voice cloning synthesizer for a new speaker using real speech data are disclosed. Utterances from one or more target speakers are parameterized and are used to initialize an embedding vector for use with a voice synthesizer, by means of clustering the utterance data and determining the centroid of the data, using a speaker identification neural network, and/or by finding the closest stored embedded vector to the utterance data.

19 Claims, 6 Drawing Sheets

(51) Int. Cl.

| | |
|---|---|
| ***G10L 13/033*** | (2013.01) |
| ***G10L 13/047*** | (2013.01) |
| ***G10L 13/08*** | (2013.01) |
| ***G10L 17/12*** | (2013.01) |

(56) References Cited

U.S. PATENT DOCUMENTS

| | | | | |
|---|---|---|---|---|
| 7,996,218 | B2 | 8/2011 | Kim | |
| 10,013,973 | B2 | 7/2018 | Doddipatla | |
| 10,186,251 | B1 | 1/2019 | Mohammadi | |
| 10,380,992 | B2 | 8/2019 | Talwar | |
| 2017/0076715 | A1 | 3/2017 | Ohtani | |
| 2017/0301340 | A1 | 10/2017 | Yassa | |
| 2019/0066713 | A1 | 2/2019 | Mesgarani | |
| 2019/0251952 | A1 * | 8/2019 | Arik | G10L 13/08 |

FOREIGN PATENT DOCUMENTS

| | | | | | |
|---|---|---|---|---|---|
| CN | 109979432 | A | * | 7/2019 | |
| CN | 110099332 | B | * | 8/2021 | H04R 3/00 |
| EP | 3742436 | A1 | * | 11/2020 | G06N 3/0445 |
| JP | 2015018080 | A | | 1/2015 | |
| KR | 20190012066 | A | * | 2/2019 | |
| KR | 20190085882 | A | * | 7/2019 | |
| WO | 8704292 | W | | 7/1987 | |

OTHER PUBLICATIONS

Jia, Y. et al."Transfer Learning from Speaker Verification to Multispeaker Text-To-Speech Synthesis" 3rd conference on Neural Information Processing Systems, Montreal, Canada, 2018, pp. 1-15.

Zhou, C. et al. "Voice Conversion with Conditional SampleRNN," in Proc. Interspeech 2018, 2018, pp. 1973-1977).

* cited by examiner

SYSTEMS AND METHODS FOR ADAPTING HUMAN SPEAKER EMBEDDINGS IN SPEECH SYNTHESIS

CROSS REFERENCE TO RELATED APPLICATIONS

This application claims priority to U.S. Provisional Patent Application No. 62/889,675, filed Aug. 21, 2019 and United States Provisional Patent Application No. 63/023,673, filed May 12, 2020, each of which is hereby incorporated by reference in its entirety.

TECHNICAL FIELD

The present disclosure relates to improvements for the processing of audio signals. In particular, this disclosure relates to processing audio signals for speech style transfer implementations.

BACKGROUND

Speech style transfer, or voice cloning, can be accomplished by a deep learning neural network model trained to synthesize speech that sounds like a particular identified speaker using an input other than from that speaker, e.g. from speech waveforms from another speaker or from text. An example of such a system is a recurrent neural network, such as the SampleRNN generative model for voice conversion (see e.g. Cong Zhou, Michael Horgan, Vivek Kumar, Cristina Vasco, and Dan Darcy, "Voice Conversion with Conditional SampleRNN," in Proc. Interspeech 2018, 2018, pp. 1973-1977). Since the model needs to be rebuilt (adapted) for each speaker's voice style to be synthesized, initializing the embedding vector for a new voice style is important for efficient convergence.

The training datasets used in speech synthesis development are mostly clean data with consistent speaking styles and similar recording conditions for each speaker, e.g. people reading audiobooks. Using real speech data (for example, taking samples from movies or other media sources) is much more challenging as there is limited amount of clean speech, there are a variety of recording channel effects, and the source might have a variety of speaking styles for a single speaker including different emotions and different acting roles—therefore it's difficult to build a speech synthesizer with real data.

SUMMARY

Various audio processing systems and methods are disclosed herein. Some such systems and methods may involve training a speech synthesizes. A method may be computer-implemented in some embodiments. For example, the method may be implemented, at least in part, via a control system comprising one or more processors and one or more non-transitory storage media.

In some examples, a system and method for adapting a voice cloning synthesizer for a new speaker using real speech data is described, including creating embedding data for different speaking styles for a given speaker (as opposed to merely differentiating embedding data by the speaker's identity) without the arduous task of manually labeling all the data bit by bit. Improved methods for initializing the embedding vector for the speech synthesizer are also disclosed, providing faster convergence of the speech synthesis model.

In some such examples, the method may involve receiving as input a plurality of waveforms comprising a plurality of waveforms each corresponding to an utterance in a target style; extracting features of the at least one waveform to create a plurality of embedding vectors; clustering the embedding vectors producing at least one cluster, each cluster having a centroid; determining the centroid of a cluster of the at least one cluster; designating the centroid of the cluster as an initial embedding vector for a speech synthesizer; and adapting the speech synthesizer based on at least the initial embedding vector, thereby producing a synthesized voice in the target style.

According to some implementations, at least some operations of the method may involve changing a physical state of at least one non-transitory storage medium location. For example, updating a voice synthesizer table with the initial embedding vector.

In some examples the method further comprises pre-processing the plurality of waveforms to remove non-language sounds and silence. In some examples each cluster has a threshold distance from its centroid and the adapting further comprises fine-tuning based on the plurality of embedding vectors of the target style in the threshold distance. In some examples the speech synthesizer is a neural network. In some examples the extracting features further comprises combining sample embedding vectors extracted from window samples of a waveform to produce an embedding vector for the waveform. In some examples the combining comprises averaging the sample embedding vectors. In some examples, the input is from a film or video source. In some examples, the target style comprises a speaking style of a target person. In some examples, the target style further comprises at least one of age, accent, emotion, and acting role.

In some examples, the method may involve receiving as input a plurality of waveforms comprising a plurality of waveforms each corresponding to an utterance in a target style; extracting features of the at least one waveform to create a plurality of embedding vectors; calculating vector distances on an embedding vector of the plurality of embedding vectors, comparing the embedding vector distance to a plurality of known embedding vectors; determining a known embedding vector of the known embedding vectors with a shortest distance from the embedding vector; designating the known embedding vector as an initial embedding vector for a speech synthesizer; adapting the speech synthesizer based on the initial embedding vector; and synthesizing a voice in the target style with the adapted speech synthesizer.

In some examples, the method may involve receiving as input a plurality of waveforms comprising a plurality of waveforms each corresponding to an utterance in a target style; extracting features of the at least one waveform to create a plurality of embedding vectors; using a voice identification system on an embedding vector of the plurality of embedding vectors, producing a known embedding vector corresponding to a voice identified by the voice identification system as being a closest correspondence to the embedding vector; designating the known embedding vector as an initial embedding vector for a speech synthesizer; adapting the speech synthesizer based on the initial embedding vector; and synthesizing a voice in the target style with the adapted speech synthesizer.

In some examples, the voice identification system is a neural network.

Some or all of the methods described herein may be performed by one or more devices according to instructions (e.g. software) stored on one or more non-transitory media.

Such non-transitory media may include memory devices such as those described herein, including but not limited to random access memory (RAM) devices, read-only memory (ROM) devices, etc. Accordingly, various innovative aspects of the subject matter described in this disclosure may be implemented in a non-transitory medium having software stored thereon. The software may, for example, be executable by one or more components of a control system such as those disclosed herein. The software may, for example, include instructions for performing one or more of the methods disclosed herein.

At least some aspects of the present disclosure may be implemented via an apparatus or apparatuses. For example, one or more devices may be configured for performing, at least in part, the methods disclosed herein. In some implementations, an apparatus may include an interface system and a control system. The interface system may include one or more network interfaces, one or more interfaces between the control system and memory system, one or more interfaces between the control system and another device and/or one or more external device interfaces. The control system may include at least one of a general-purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system may include one or more processors and one or more non-transitory storage media operatively coupled to one or more processors.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings generally indicate like elements, but different reference numbers do not necessarily designate different elements between different drawings.

DETAILED DESCRIPTION

As used herein, a voice "style" refers to any grouping of waveform parameters that distinguishes it from another source and/or another context. Examples of "styles" include differentiating between different speakers. It could also refer to differences in the waveform parameters for a single speaker speaking in different contexts. The different contexts can include, for example, the speaker speaking at different ages (e.g. a person speaking when they are a teenager sounds different then they do when they are middle aged, so those would be two different styles), the speaker speaking in different emotional states (e.g. angry vs. sad vs. calm etc.), the speaker speaking in different accents or languages, the speaker speaking in different business or social contexts (e.g. talking with friends vs. talking with family vs. talking with strangers etc.), actors speaking when playing different roles, or any other contextual difference that would affect a person's mode of speaking (and, therefore, produce different voice waveform parameters generally). So, for example, person A speaking in a British accent, person B speaking in a British accent, and person A speaking in a Canadian accent would be considered 3 different "styles".

As used herein, "waveform parameters" refer to quantifiable information that can be derived from an audio waveform (digital or analog). The derivation can be made in the time and/or frequency domain. Examples include pitch, amplitude, pitch variation, amplitude variation, phasing, intonation, phonic duration, phoneme sequence alignment, mel-scale pitch, spectra, mel-scale spectra, etc. Some or all of the parameters can also be values derived from the input audio waveform that don't have any specifically understood meaning (e.g. a combination/transformation of other values). In practice, the waveform parameters can refer to both directly measured parameters and estimated parameters.

As used herein, an "utterance" is a relatively short sample of speech, typically the equivalent of a line of dialog from a screenplay (e.g. a phrase, sentence, or series of sentences over a few seconds).

As used herein, a "voice synthesizer" is a machine learning model that can convert an input of text or speech into an output of that text or speech spoken in with particular qualities that the model has learned. The voice synthesizer uses an embedding vector for a particular "identity" of output speaking style. See e.g. Chen, Y., et al. "Sample efficient adaptive text-to-speech." In International Conference on Learning Representations, 2019.

Figure 1:
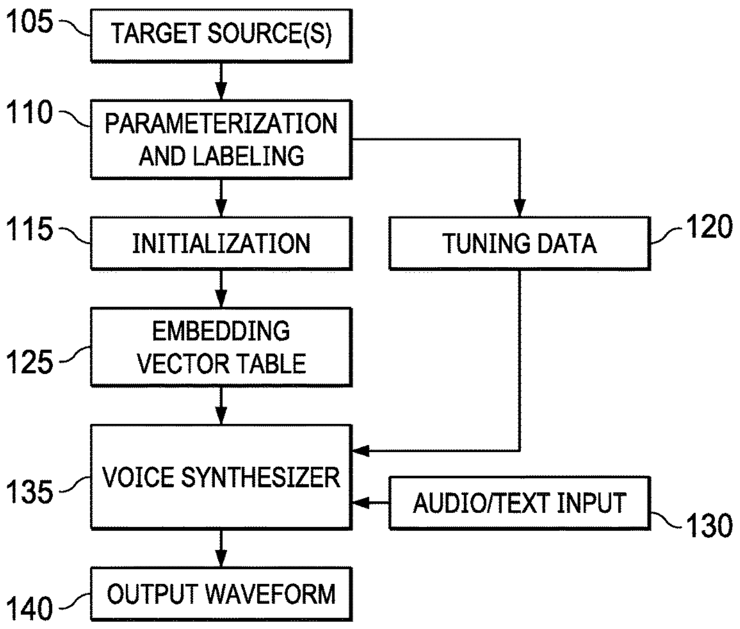
FIG. 1 illustrates an example of a method of voice cloning.

FIG. 1 illustrates an example of voice cloning using the initialized embedding vector approach. The waveforms of utterances for the target voice style are taken from one or more sources (105). Examples of sources include movie/television/video clips, audio recordings, and live sampling/broadcast. The waveforms can be filtered before feature extraction to eliminate some or all non-verbal components, such as sighs, silence, laughter, coughing, etc. For example, a voice activity detector (VAD) can be used to trim out the non-verbal components. Additionally or in the alternative, a noise suppression algorithm can be used to remove background noise. The noise suppression algorithm can be subtractive or can be based on computational auditory scene analysis (CASA) or can be based on similar techniques known in the art. Additionally or in the alternative, an audio leveler can be used to adjust the waveforms to be on the same level frame-by-frame. For example, an audio leveler can set the waveforms to −23 dB.

The waveforms from the target source(s) are then parameterized (110) by feature extraction into a number of waveform parameters, such that a vector is formed for each utterance. The number of parameters depends on the input for the voice synthesizer (135), and can be any number (such as 32, 64, 100, or 500).

These vectors can be used to determine an initialization vector (115) to go in the embedding vector table (125), a listing of all styles that can be used by the voice synthesizer (135) for training a new model for cloning. Additionally, some or all of the vectors can be used as tuning data (120) for fine tuning the voice synthesizer (135). The voice synthesizer (135) adapts a machine learning model, like a neural network, to take language input (130) in the form of voice audio or text and produce an output waveform (140) of synthesized speech in a style of the target source (105). Adaption of the model can be performed by updating the model and the embedding vector through stochastic gradient descent.

One example of parameterization is phoneme sequence alignment estimation. This can be performed by the use of a forced aligner (e.g. Gentile™) based on a speech recognition system (e.g. Kaldi™). This converts audio to Mel-frequency cepstral coefficient (MFCC) features, and converts text to known phonemes through a dictionary. It then does an alignment between the MFCC features and phonemes. The output contains 1) a sequence of phonemes and 2) the timestamp/duration of each phoneme. Based on the phonemes and phoneme durations, one can compute the statistics of phoneme duration and the frequency of phonemes being spoken, as parameters.

Another example of parameterization is pitch estimation, or pitch contour extraction. This can be done with a program such as the WORLD vocoder (DIO and Harvest pitch trackers) or the CREPE neural net pitch estimator. For example, one can extract pitch for every 5 ms, so that for every 1 s speech data as input, one would get 200 floating numbers in sequence representing pitch absolute values. Taking the log operation on these floating numbers, then normalizing them for each target speaker, one can produce a contour around 0.0 (e.g., values like "0.5"), instead of absolute pitch values (e.g. 200.0 Hz). For systems like the WORLD pitch estimator, it uses speech temporal characteristics in high level. It first uses a low-pass filter with different cutoff frequencies, and if the filtered signal only consists of the fundamental frequency, it forms a sine wave, and the fundamental frequency can be obtained based on the period of this sine wave. Zero-crossing and peak dip intervals can be used to choose the best fundamental frequency candidate. The contour shows the pitch variation, so one can calculate the variance of normalized contour to know how much variation is in the waveform.

Another example of parameterization is amplitude derivation. This can be done, for example, by first calculating the short-time Fourier transform (STFT) of the waveform to get the spectra of the waveform. A Mel-filter can be applied to the spectra to get a mel-scale spectra, and this can be log-scale converted to a log-mel-scale spectra. Parameters such as absolute loudness and amplitude variance can be calculated based from the log-mel-scale spectra.

In some embodiments, the parameterization step (110) includes labeling the data from the speaker. Since this is based on the source, the labeling step can be performed for the data en masse rather than piece-by-piece. Note that data labelled for a single speaker could contain multiple styles of speaking.

In some embodiments, the parameterization (110) includes phenome extraction and alignment with the input waveform. An example of this process is to transcribe the waveforms into text (manually or by an automatic speech recognition system), then convert a sequence of the text to a sequence of phonemes by a dictionary search (for example, using the t2p Perl script), then aligning the phoneme sequences with the waveforms. A timestamp (starting time and ending time) can be associated to each phoneme (for example, using the Montreal Forced Aligner to convert audio to MFCC features, and create alignment between MFCC features and phonemes). For this, the output contains: 1) a sequence of phonemes 2) the timestamp/duration of each phoneme.

FIGS. 2-7 describe further embodiments of the present disclosure. The following description of such further embodiments will focus on the differences between such embodiments and the embodiment previously described with reference to FIG. 1. Therefore, features that are common to one of the embodiments of FIGS. 2-7 and the embodiment of FIG. 1 can be omitted from the following description. If so, it should be assumed that features of the embodiment of FIG. 1 are or at least can be implemented in the further embodiments of FIGS. 2-7, unless the following description thereof requires otherwise.

Figure 2:
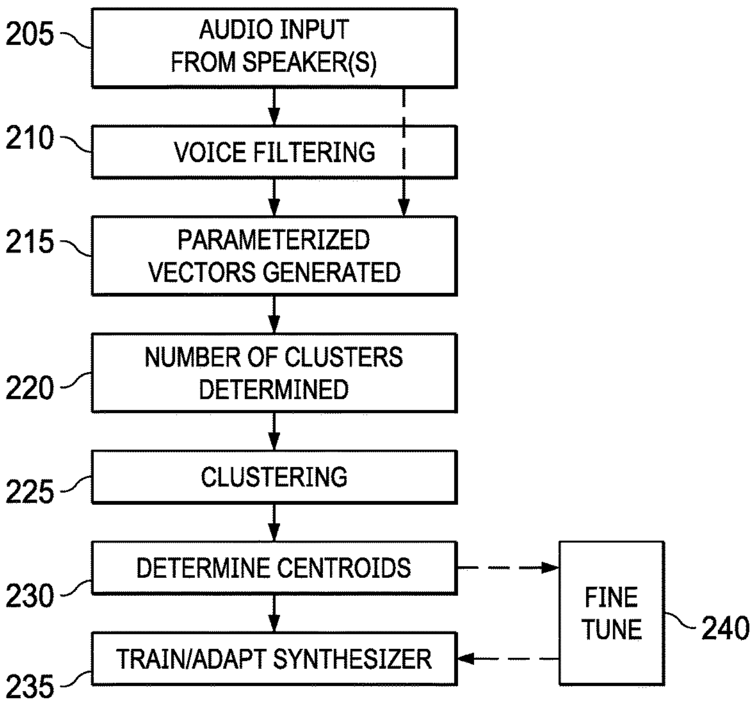
FIG. 2 illustrates an example of a method of initializing an embedding vector for voice cloning by using clustering.

In one embodiment, the initialization can be performed by clustering. FIG. 2 shows an example method of the clustering method. As similarly described for FIG. 1, the input sample waveforms (205) are either directly encoded, by feature extraction, into parameterized vectors (215) or they are first sent through a voice filtering algorithm (210) and then parameterized (215). The input can be for several distinct styles (multiple styles from one speaker, or from different speakers), with the data labeled appropriately. Analysis can be performed on the input to determine the number of clusters (220) expected to be found in the vector space.

In some embodiments, the number of clusters are determined using a statistical analysis of the input and attempts to represent the number of distinct styles in the input data. In some embodiments, the statistics of phoneme and triphone duration (indicating how fast the speaker is speaking), statistics of pitch variance (indicating how dramatic the speaker is changing tone), statistics of absolute loudness (indicating how loud the speaker is talking) are analyzed as features to estimate the number of spoken styles (clusters), e.g. calculating one mean and one variance for each of the feature sequences, and then looking at all the means and variances, and then roughly estimate how many mean/variance clusters there are.

In some embodiments, the number of clusters are automatically determined by the clustering algorithm, for certain data. A clustering algorithm (225) is performed on the data to find clusters of input. This can be, for example, a k-means or Gaussian mixture model (GMM) clustering algorithm. With the clusters identified, the centroids of each cluster are determined (230). The centroids are used as initialized embedding vectors for each cluster/style for training/adapting the synthesizer (235) for that style. The input data labeled for that style within the corresponding cluster variance from the corresponding centroid (inside the cluster space) can be used as the fine-tuning data (240) for the synthesizer adaptation (235).

Some embodiments of synthesizer adaption (235) only adapt the speaker embedding vector. For example, let the training objective be: $p(x|x_{1 \ldots t-1}, emb, c, w)$, where x is the sample (at time t), $x_{1 \ldots t-1}$ is the sample history, emb is the embedding vector, c is the conditioning information which contains the extracted conditioning features (e.g. pitch contour, phoneme sequence with timestamp, etc.), and w represents the weights of conditional SampleRNN. Fix c and w and only perform stochastic gradient descent on emb. Once the training reaches convergence, stop training. The updated emb is assigned to the speaker target (the new speaker).

In some embodiments of synthesizer adaption (235), the speaker embedding vector is adapted first, then the model (all or part) is updated directly. For example, let the training objective be: $p(x|x_{1 \ldots t-1}, emb, c, w)$, where x is the sample (at time t), $x_{1 \ldots t-1}$ is the sample history, emb is the embedding vector, c is the conditioning information which contains the extracted conditioning features (e.g. pitch contour, phoneme sequence with timestamp, etc.), and w represents the weights of conditional SampleRNN. Fix c and w and only do stochastic gradient descent on emb. Once the training of emb reaches convergence, start stochastic gradient descent on w. Alternatively, once the training of emb reaches convergence, start stochastic gradient descent on the last output layer of conditional SampleRNN. Optionally, train a few steps (e.g. 1000 steps) of gradient updates. The updated w and emb are assigned together to the speaker target (the new speaker).

As used herein, training reaching "convergence" refers to a subjective determination of when the training shows no substantial improvement. For speech cloning, this can include listening to the synthesized speech and making a subjective evaluation of the quality. When training a synthesizer, both the loss curve of training set and loss curve of validation set can be monitored and, if the loss of validation set does not decrease for some threshold number of epochs (e.g. 2 epochs), then the learning rate can be decreased (e.g. 50% rate).

In some embodiments, only the speaker embedding is adapted in the adaption stage. The loss curve can be monitored and a subjective evaluation can be made to determine if training has reached convergence. If there is no subjective improvement, training can be stopped and the rest of the model can be fine tuned at a low (e.g. $1\times10^{-6}$) learning rate for a few gradient update steps. Again, subjective evaluation can be used to determine when to stop training. The subjective evaluation can also be used to gauge the efficacy of the training procedure.

Figure 3:
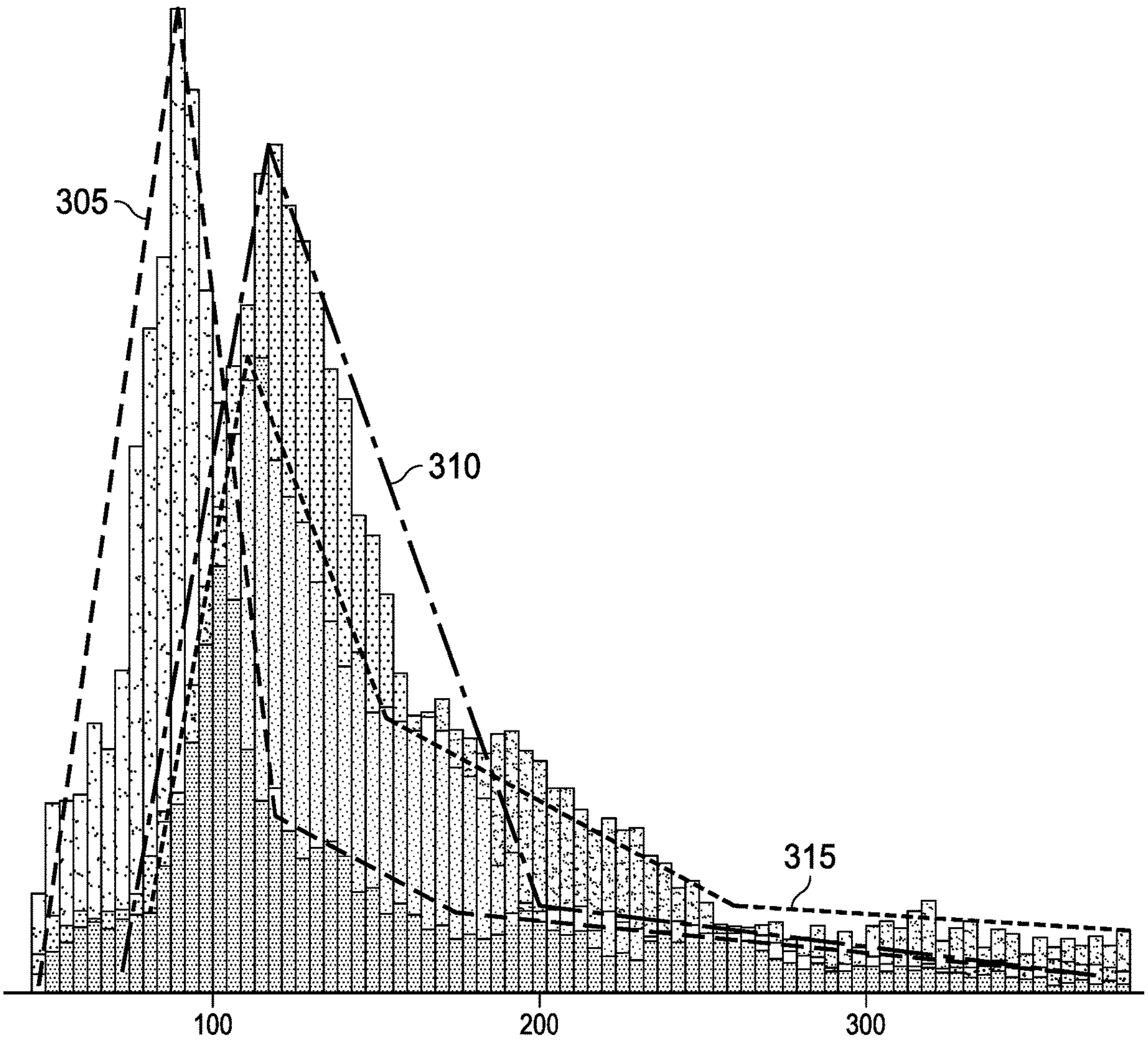
FIG. 3 illustrates an example of histogram data for voice pitch data to determine the number of clusters to use for clustering.

Different approaches could be used to select the most appropriate number of clusters. In some embodiments, pitch analysis can be performed to determine the number of clusters. Preprocessing such as silence trimming and non-phonetic region trimming (similar to the filtering (210) shown in FIG. 2) could be applied before pitch extraction. FIG. 3 shows an example histogram of pitches (in Hz) for one person talking at two different ages. The bars under the dashed lines (305) show pitch values (extracted, for example, in 5 ms increments) for the person at age 50-60. The bars under the dash-dot (310) and dotted (315) lines show the pitch values for that same person at age 20-30. This could indicate that the appropriate number of clusters is three—one for age 50-60 and two for age 20-30, meaning that the person had at least two styles of speech in their 20's, perhaps reflecting accent, emotion, or other contextual difference. Note that in this example, the 50-60 age range (305) shows very low variance and a center pitch under 100 Hz, while the 20-30 age range (310 and 315) show larger variance and center pitches around both 130 and 140 Hz. This indicates that there are at least two speaking styles in the 20-30 age range. A pitch variance threshold can be set to determine how many clusters are to be used. If the pitch variance is too large to estimate the number clusters, this indicates that other parameters (other than or in addition to pitch) should be used to determine the number of clusters (the network needs to learn styles beyond just pitch-based styles). In some embodiments, sentiment analysis can be performed on the transcriptions and the emotion classification results can be used as an initial estimation of the number of voicing styles. In some embodiments, the number of acting roles the speaker (being an actor in this case) played in these sources as an initial estimation of the number of voicing styles.

Figure 4A:
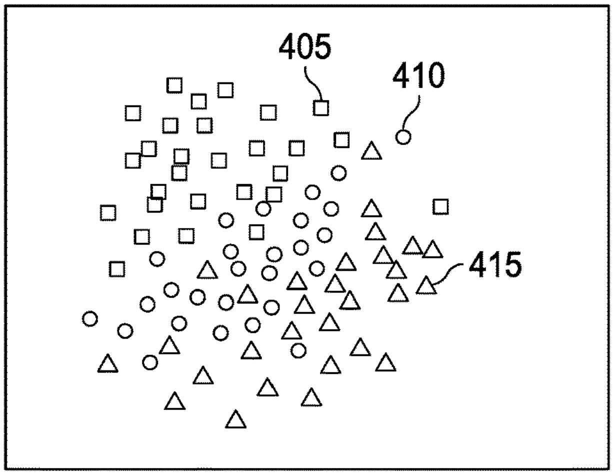
FIGS. 4A-4C illustrate an example 2-D projection of clustering voice data.
Figure 4B:
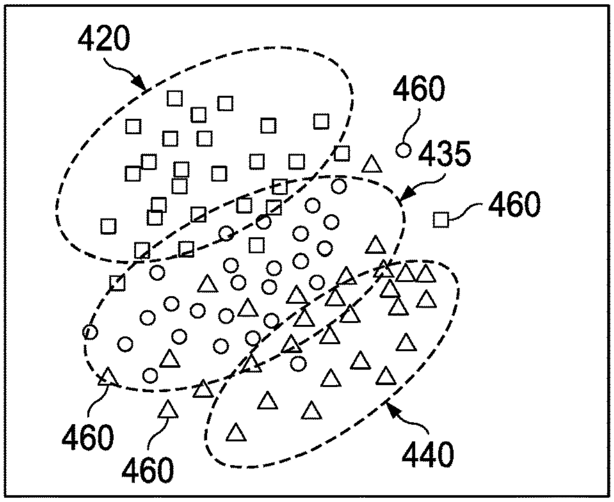
Figure 4C:
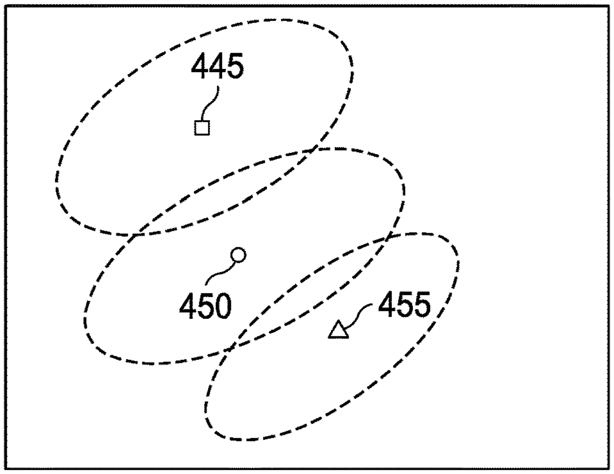

FIGS. 4A-4C show an example of clustering, projected into 2-D space (the actual space would be N-dimensional, where N is the number of parameters, e.g. 64-D). FIG. 4A shows utterance data points (vectors of parameters) for three sources, represented here as squares (405), circles (410), and triangles (415) respectively. FIG. 4B shows the data clustered into three clusters (420, 435, and 440) with the threshold distance of the centroids (not shown in FIG. 4B) of each cluster indicated in dotted lines. The threshold distance can be set by the user; or it can be set equal to the variance of the cluster as determined by the algorithm. FIG. 4C shows the centroids (445, 450, and 455) for the three clusters. The centroids do not necessarily correlate with any input data directly—they are calculated from the clustering algorithm. These centroids (445, 450, and 455) can then be used as initial embedding vectors for the speech synthesizing model, and can be stored in a table with other styles for future use (each style being treated as a separate ID in the table, even if from the same person). Input data whose label matches the centroid of a cluster can be used to fine tune the speech synthesizing model; the outlier data (examples shown as 460) can be pruned from being used as tuning data for being outside the threshold distance (420, 435, 440) from its corresponding centroid (445, 450, 455). In some embodiments there is only one single (global) cluster used for a speaker, aka speaker identity embedding without clustering. In some embodiments there are multiple clusters used for a speaker, aka style embedding.

Figure 5:
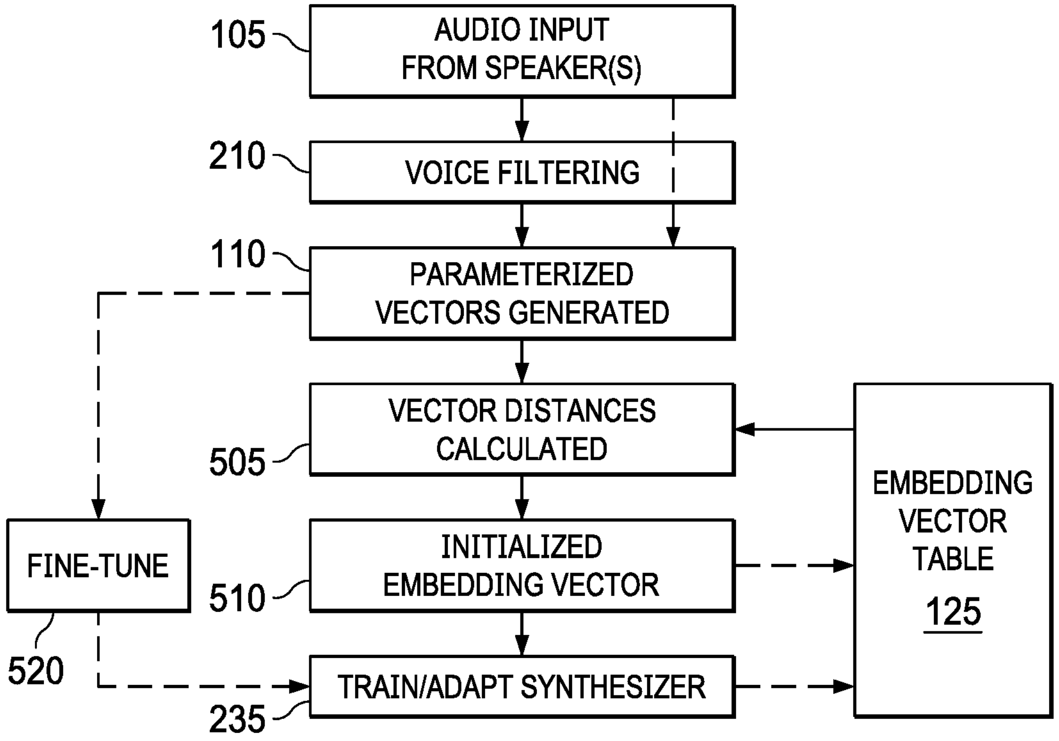
FIG. 5 illustrates an example of a method for initializing an embedding vector for voice cloning using vector distance calculations.

FIG. 5 shows an example of initializing an embedding vector by vector distance to previously established embedding vectors. A voice synthesizer based on machine learning can have an embedding vector table (125) that provides embedding vectors related to different voice styles (different speakers or different styles, depending on how the table was built) available for simulation or voice cloning. This resource can be used to generate an initial embedding vector (510) for adapting the synthesizer (235) to the new style.

The parameterized vectors (110) can be compared (distance) (505) to the values of the embedding vector table (125) to determine a closest vector from the table, which is used as the initialized embedding vector (510) to adapt the synthesizer (235). Either a random (e.g. first generated) parameterized vector can be used for the distance calculations (505), or an average parameterized vector can be built from multiple parameterized vectors and used for the distance calculations (505). The more embedding vectors from the table (125) that used for the distance calculations (505), the greater the accuracy of the resulting initialized embedding vector (510), since that provides a greater probability that a voice style very close to the input is available. The adaptation (235) can also be fine-tuned (520) from the parameterized vectors (110). The adaptation (235) can update the embedding vector based on the fine-tuning (520) for entry into the embedding vector table (125), or the initialized embedding vector (510) can be populated into the table (125) with a new identification relating it to the new style.

Vector distance calculations can include Euclidean distance, vector dot product, and/or cosine similarity.

Figure 6:
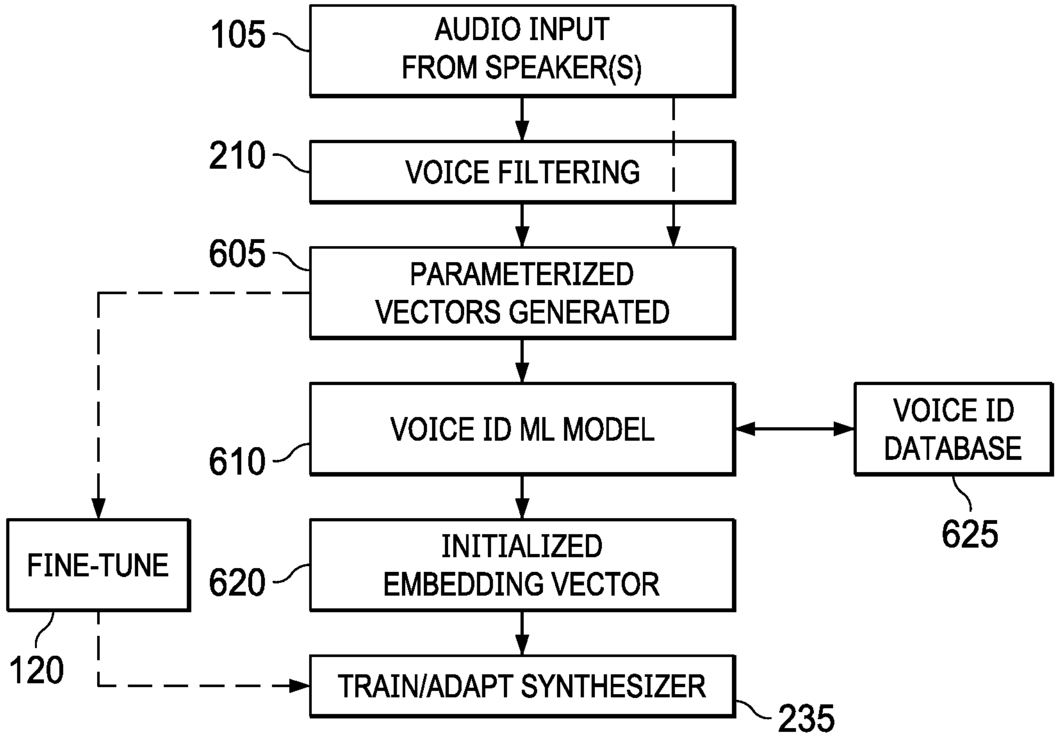
FIG. 6 illustrates an example of a method for initializing an embedding vector for voice cloning using voice ID machine learning.

FIG. 6 shows and example of initializing an embedding vector by voice identification deep learning. The utterances (105, 210) are feature extracted for use with a voice identification machine learning system (610). The feature extraction could be the same as feature extraction for the voice synthesizer (235), or it can be different. The voice identification machine learning system can be a neural network.

If it is the same, the parameterized vectors (605) are run through the voice ID system (610) to "identify" which entry in the voice ID database (625) matches the utterances. Obviously, the speaker is not normally in the voice ID database at this point, but if there is a large number of entries in the table (for example, 30 k), then the identified speaker from the table (625) should be a close match to the style of the utterances. This means that the embedded vector from the voice ID database (625) selected by the voice ID model (610) can be used as an initialized embedding vector to adapt the voice synthesizer (235). As with other initialization methods, this can be fine-tuned with the parameterized vectors (605) for the utterances.

If the parameters for the voice ID system are different than the parameters of the synthesizer, then the method is largely the same, but the initialized embedding vector will have to be looked up from the database (625) in a form appropriate for the synthesizer (235) and the fine-tuning data (120) will have to go through separate feature extraction from the voice ID parameterization (605).

Figure 7:
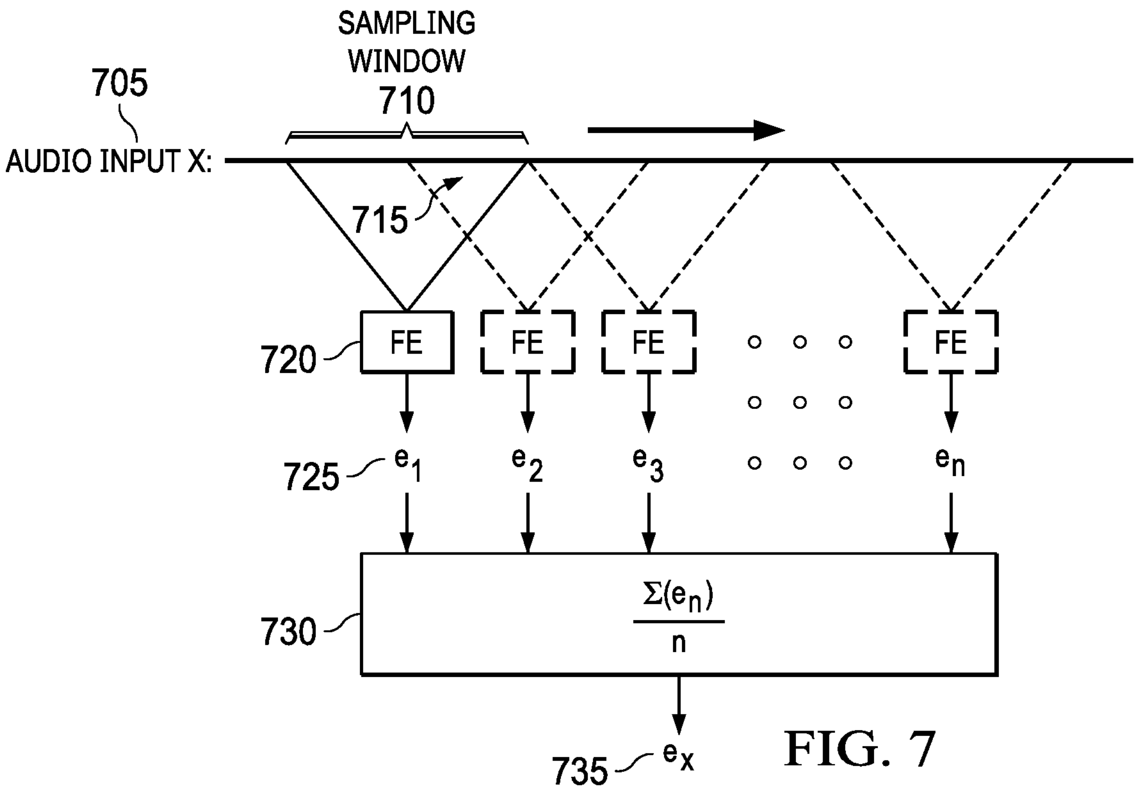
FIG. 7 illustrates an example of calculating a representative embedded vector by sampling.

In some embodiments, the feature extraction for the utterances can be done by combining extracted vectors from shorter segments of the longer utterance. FIG. 7 shows an example of an averaged extracted vector for an utterance. Utterance X (705) is input as a waveform, for some duration, for example 3 seconds. The waveform (705) is sampled over a moving sampling window (710) of some smaller duration, for example 5 ms. The window samples can overlap (715). The windowing can be run sequentially over the waveform, or simultaneously in parallel over a portion or all of the waveform. Each sample undergoes feature extraction (720) to produce a group of n embedding vectors (725) $e_1$-$e_n$. These embedding vectors are combined (730) to produce a representative embedding vector (735), ex, for the utterance X (705). An example of combining the vectors (730) is taking an average of the vectors (725) from the window samples (710). Another example of combining the vectors (730) is using a weighted sum. For example, a voicing detector can be used to identify the voicing frames (for example, "i" and "aw") and un-voicing frames (for example, "t", "s", "k"). Voicing frames can be weighted over un-voicing frames, because voicing frames contribute more to the perception of how the speech sounds. The utterance (705) can be raw audio or pre-processed audio with silence and/or non-verbal portions of the waveform trimmed.

Figure 8:
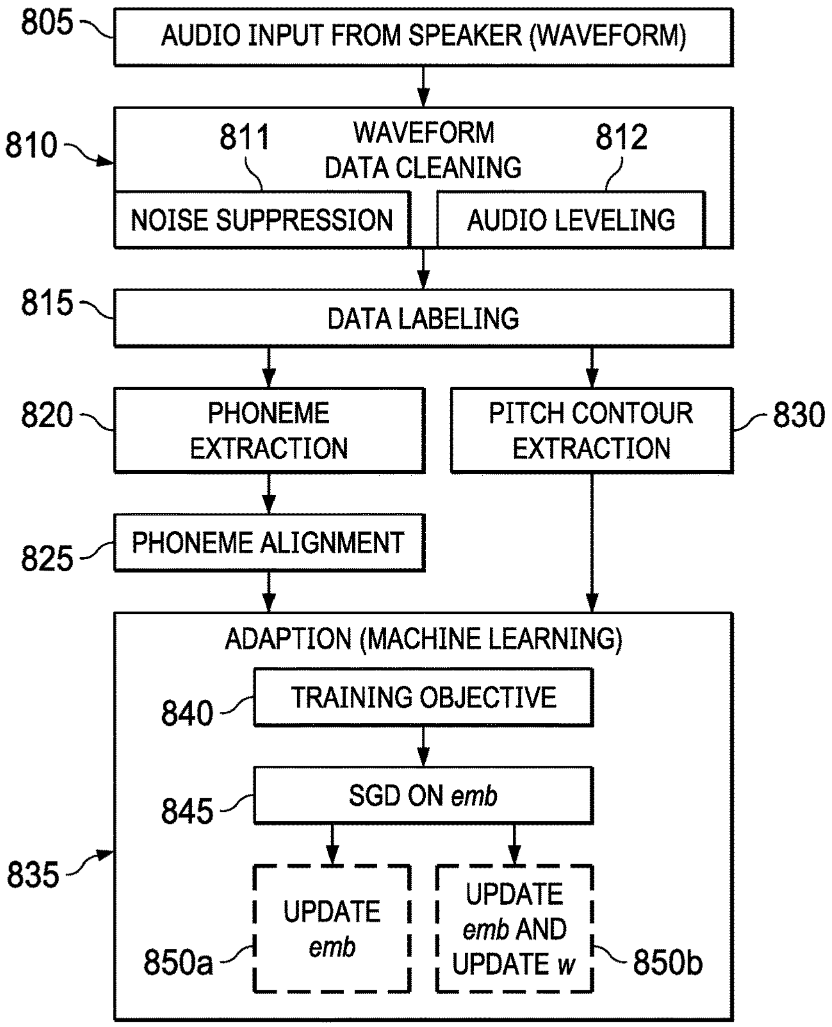
FIG. 8 illustrates an example voice synthesizer method according to an embodiment of the disclosure.
Figure 9:
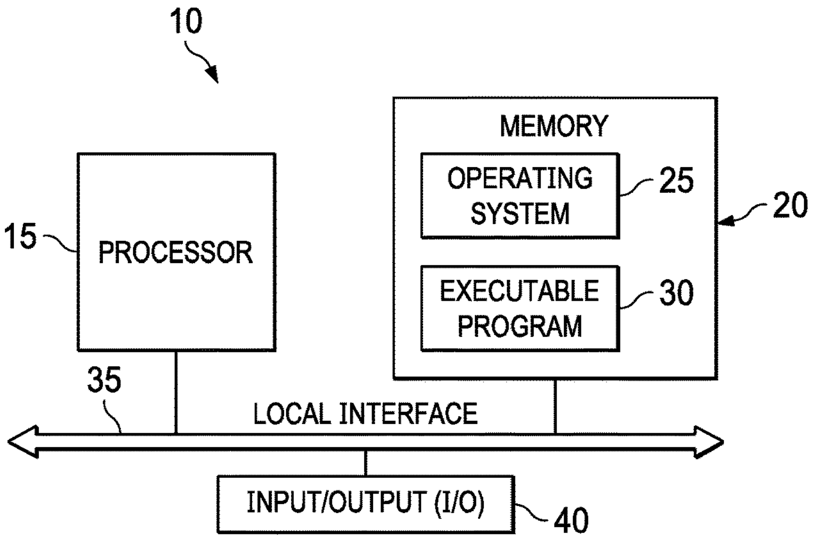
FIG. 9 illustrates an example hardware implementation of the methods described herein.

According to some embodiments, a voice synthesizer system can be as shown in FIG. 8. Given an input (805) of a waveform from a voice utterance, the waveform data can first be "cleaned" (810). This can include the use of a noise suppression algorithm (811) and/or an audio leveler (812). Next the data can be labeled (815) to identify the waveforms to a speaker. Then the phonemes are extracted (820) and the phoneme sequences are aligned (825) with the waveform. Also the pitch contour can be extracted (830) from the waveform. The aligned phonemes (825) and pitch contour (830) provides parameters for the adaption (835). The adaption has set up a training objective based on conditional SampleRNN weighting (840), then stochastic gradient descent is performed on the embedding vector (845). Once the training on the embedding vector is converged, either a) the training is stopped and the updated embedding vector is assigned to the speaker (**850*a*) or b) a stochastic gradient descent is performed on the weights (or the last output layer of conditional SampleRNN) and the resulting updated embedding vector is assigned to the speaker (850*b*). Embodiments of this example FIG. 9 is an exemplary embodiment of a target hardware (10) (e.g., a computer system) for implementing the embodiment of FIGS. 1-8. This target hardware comprises a processor (15), a memory bank (20), a local interface bus (35) and one or more Input/Output devices (40). The processor may execute one or more instructions related to the implementation of FIGS. 1-8 and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor-based system. In some embodiments, the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a USB flash drive. In some embodiments, the operating system (25) facilitates these tasks by being the central element to gathering the various data and instructions required for the execution of the program and provide these to the microprocessor. In some embodiments, the operating system may not exist, and all the tasks are under direct control of the processor (15), although the basic architecture of the target hardware device (10) will remain the same as depicted in FIG. 9. In some embodiments, a plurality of processors may be used in a parallel configuration for added execution speed. In such a case, the executable program may be specifically tailored to a parallel execution. Also, in some embodiments the processor (15) may execute part of the implementation of FIGS. 1-8 and some other part may be implemented using dedicated hardware/firmware placed at an Input/Output location accessible by the target hardware (10) via local interface (35). The target hardware (10) may include a plurality of executable programs (30**), wherein each may run independently or in combination with one another.

A number of embodiments of the disclosure have been described. Nevertheless, it will be understood that various modifications may be made without departing from the spirit and scope of the present disclosure. Accordingly, other embodiments are within the scope of the following claims.

The present disclosure is directed to certain implementations for the purposes of describing some innovative aspects described herein, as well as examples of contexts in which these innovative aspects may be implemented. However, the teachings herein can be applied in various different ways. Moreover, the described embodiments may be implemented in a variety of hardware, software, firmware, etc. For example, aspects of the present application may be embodied, at least in part, in an apparatus, a system that includes more than one device, a method, a computer program product, etc. Accordingly, aspects of the present application may take the form of a hardware embodiment, a software embodiment (including firmware, resident software, microcodes, etc.) and/or an embodiment combining both software and hardware aspects. Such embodiments may be referred to herein as a "circuit," a "module", a "device", an "apparatus" or "engine." Some aspects of the present application may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability.

What is claimed is:

1. A method to synthesize a voice in a target style, comprising:
   - receiving as input at least one waveform, each corresponding to an utterance in the target style;
   - extracting features on the at least one waveform and generating at least one embedding vector from the extracted features;
   - calculating vector distances on an embedding vector of the at least one embedding vector to determine embedding vector distances to each of a plurality of known embedding vectors;
   - determining a known embedding vector of the known embedding vectors with a shortest distance from the embedding vector;
   - designating the known embedding vector as an initial embedding vector for a speech synthesizer;
   - adapting the speech synthesizer based on the initial embedding vector; and synthesizing a voice in the target style with the adapted speech synthesizer.

2. A method to synthesize a voice in a target style, comprising:
   - receiving as input at least one waveform, each corresponding to an utterance in the target style;
   - extracting features of the at least one waveform and generating at least one embedding vector from the extracted features;
   - using a voice identification system on an embedding vector of the at least one embedding vector to generate a known embedding vector corresponding to a voice identified by the voice identification system as being a closest correspondence to the embedding vector;
   - designating the known embedding vector as an initial embedding vector for a speech synthesizer;
   - adapting the speech synthesizer based on the initial embedding vector; and synthesizing a voice in the target style with the adapted speech synthesizer.

3. The method of claim 2, wherein the voice identification system is a neural network.

4. A method to synthesize a voice in a target style, comprising:
   - receiving as input at least one waveform, each corresponding to an utterance in the target style;
   - extracting features of the at least one waveform and generating at least one embedding vector from the extracted features;
   - applying a clustering algorithm to the at least one embedding vector to find at least one cluster;
   - calculating, using the clustering algorithm, a centroid of a cluster of the at least one cluster;
   - generating an initial embedding vector for a speech synthesizer from the centroid; and
   - adapting the speech synthesizer based on at least the initial embedding vector, thereby producing a synthesized voice in the target style.

5. The method of claim 4, further comprising:
   - pre-processing the at least one waveform to remove non-language sounds and silence.

6. The method of claim 4, wherein each cluster has a threshold distance from its centroid and the adapting further comprises fine-tuning based on the at least one embedding vector of the target style in the threshold distance.

7. The method of claim 4, wherein the speech synthesizer is a neural network.

8. The method of claim 4, wherein extracting features further comprises combining sample embedding vectors extracted from window samples of a waveform of the at least one waveform to produce an embedding vector for the waveform.

9. The method of claim 8, wherein the combining comprises averaging the sample embedding vectors.

10. The method of claim 4, wherein the input is from a film or video source.

11. The method of claim 4, wherein the target style comprises a speaking style of a target person.

12. The method of claim 11, wherein the target style further comprises at least one of age, accent, emotion, and acting role.

13. The method of claim 11, wherein the target person is an actor and the target style is the target person at an age younger than their current age.

14. The method of claim 4, further comprising receiving as the input further waveforms, each corresponding to an utterance in a second style different than the target style; and
   - extracting features of the further waveforms to create at least a second embedding vector;
   - wherein the clustering further includes clustering on the second embedding vector.

15. The method of claim 14, further comprising determining an expected number of clusters prior to the clustering, wherein the clustering is based on the expected number of clusters.

16. The method of claim 15, wherein the determining an expected number of clusters uses a statistical analysis of the input.

17. The method of claim 4, further comprising updating a voice synthesizer table with the initial embedding vector.

18. A non-transitory computer readable medium configured to perform on a computer the method of claim 4.

19. A device configured to perform the method of claim 4.

* * * * *